United States Patent
Brewer

(10) Patent No.: US 7,512,664 B1
(45) Date of Patent: Mar. 31, 2009

(54) SYSTEM AND METHOD FOR LOADING RESOLVED JAVA CLASS FILES TO A CLIENT DEVICE

(75) Inventor: Jason M Brewer, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 605 days.

(21) Appl. No.: 09/494,218

(22) Filed: Jan. 28, 2000

Related U.S. Application Data

(60) Provisional application No. 60/117,550, filed on Jan. 28, 1999.

(51) Int. Cl.
G06F 15/16 (2006.01)
G06F 9/44 (2006.01)

(52) U.S. Cl. .................... 709/217; 709/218; 717/168

(58) Field of Classification Search ............ 709/203, 709/217–218; 717/168–173
See application file for complete search history.

(56) References Cited

U.S. PATENT DOCUMENTS

| | | | |
|---|---|---|---|
| 6,263,360 B1* | 7/2001 | Arnold et al. ............ 709/203 |
| 6,272,677 B1* | 8/2001 | Lam et al. ............... 717/170 |
| 6,286,138 B1* | 9/2001 | Purcell .................. 717/143 |
| 6,295,638 B1* | 9/2001 | Brown et al. ............ 717/148 |
| 6,295,645 B1* | 9/2001 | Brewer ................. 717/178 |
| 6,389,589 B1* | 5/2002 | Mishra et al. ........... 717/170 |
| 6,493,870 B1* | 12/2002 | Madany et al. .......... 717/165 |
| 6,549,918 B1* | 4/2003 | Probert, Jr. et al. ...... 707/203 |
| 6,654,954 B1* | 11/2003 | Hicks .................. 717/162 |
| 6,657,999 B1* | 12/2003 | Brewer ................. 370/362 |
| 6,954,633 B1* | 10/2005 | Metternich et al. ...... 455/414.1 |
| 6,996,722 B1* | 2/2006 | Fairman et al. .......... 713/192 |
| 7,103,794 B2* | 9/2006 | Malcolm et al. ........... 714/4 |
| 7,209,560 B1* | 4/2007 | Fairman et al. .......... 380/255 |
| 7,395,031 B1* | 7/2008 | Ritter ................... 455/77 |

\* cited by examiner

*Primary Examiner*—Douglas B Blair
(74) *Attorney, Agent, or Firm*—Mirna Abyad; Wade J. Brady, III; Frederick J. Telecky, Jr.

(57) ABSTRACT

The client loads an application class through a gateway server that preloads and preresolves a class, creates a binary representation of new portions of the preloaded and preresolved class, and sends only the new portion to the client.

9 Claims, 2 Drawing Sheets

SYSTEM AND METHOD FOR LOADING RESOLVED JAVA CLASS FILES TO A CLIENT DEVICE

FIELD ON INVENTION

This invention relates to loading resolved Java class files to a client device.

BACKGROUND OF THE INVENTION

Sending and receiving data over the Internet has become popular not only using personal computers and other conventional computer systems but also other types of devices such as cellular phones and personal communication devices and is even expected to be in television sets and set top boxes. These other type of devices have embedded microprocessors. Embedded devices are typically constrained by low memory and low power requirements. Java is a network oriented programming language associated with Sun Microsystems that is specifically designed for writing programs that can be safely downloaded to a computer via the Internet and immediately run. Java Virtual Machines are being placed on these embedded devices to interpret and execute Java applications, which consist of Java class files. Before a class file can be securely interpreted on a local device, it must be resolved and verified.

FIG. 1 illustrates the standard process for loading a Java application class. A Java application class 13 that resides on a network server 11 is downloaded to a client device 15. There the class file is verified by a security check and by determining that it is formatted correctly and loaded at load verifying device 17. A resolver 19 takes a class file (data) and creates a set of data structures that represent the fields and functions of the class that a specific interpreter 21 in Java VM on the client device can understand. This is a time consuming process that takes up computing resources and power. Furthermore, when a class is resolved, its representation in memory at the client device 15 is expanded to fill out the data structures necessary for interpretation.

In order to reduce memory requirements for Java Development Kit (JDK) classes on Personal Java, Sun Microsystems has a tool called Java Code Compact that takes a set of class files and creates a binary representation of loaded and resolved classes. JDK is a software development package from Sun Microsystems that implements the basic set of tools needed to write, test and debug Java applications and applets. The Java Code compact process sometimes referred to as ROMizing a Java class through Sun's Java Code compact tool is shown in FIG. 2. A select set of classes 22, 23 and 24 and all of their dependent classes (JDK Classes 2) are processed by the Java Code Compact tool 25, which preloads and preresolves each class. The Java Code Compact tool 25 verifies and resolves the class files and creates a c-code representation of all the resolved data and the c-code is compiled into a binary image representation of the c-code. The output is loaded into read only memory sections 26 and read-write memory sections 27 containing the loaded class data. The binary object is then linked at linker 28 with the object code from the implementation of the Java virtual machine 29. During execution, a list of binary classes is created from these classes that have already been loaded and resolved. Any class not in this list must be dynamically loaded from some other source, verified and resolved before it can be interpreted.

SUMMARY OF THE INVENTION

In accordance with one embodiment of the present invention the client loads the application through a gateway server that preloads and preresolves classes and creates a binary representation before it is sent to the client.

DESCRIPTION OF PREFERRED EMBODIMENTS OF THE PRESENT INVENTION

The present invention creates a binary representation of loaded and resolved classes at the gateway for dynamically loaded applications classes and then transfers the binary preloaded class to the client device rather than the application class file.

Figure 1:
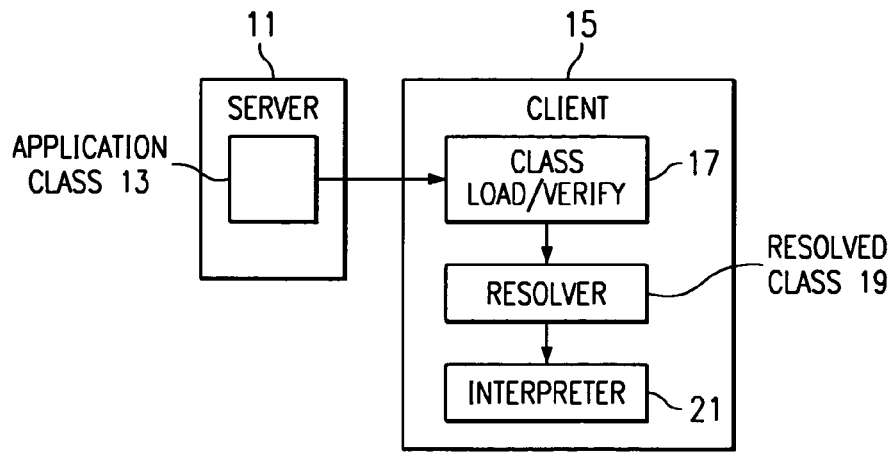
FIG. 1 is a block diagram of prior art typical Java application load.
Figure 2:
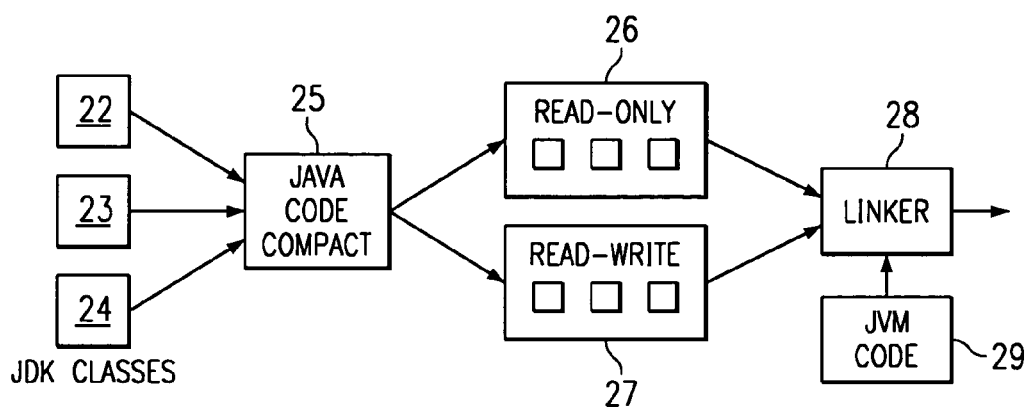
FIG. 2 illustrates Sun Microsystems' prior art class preloader with Java Code Compact.
Figure 3:
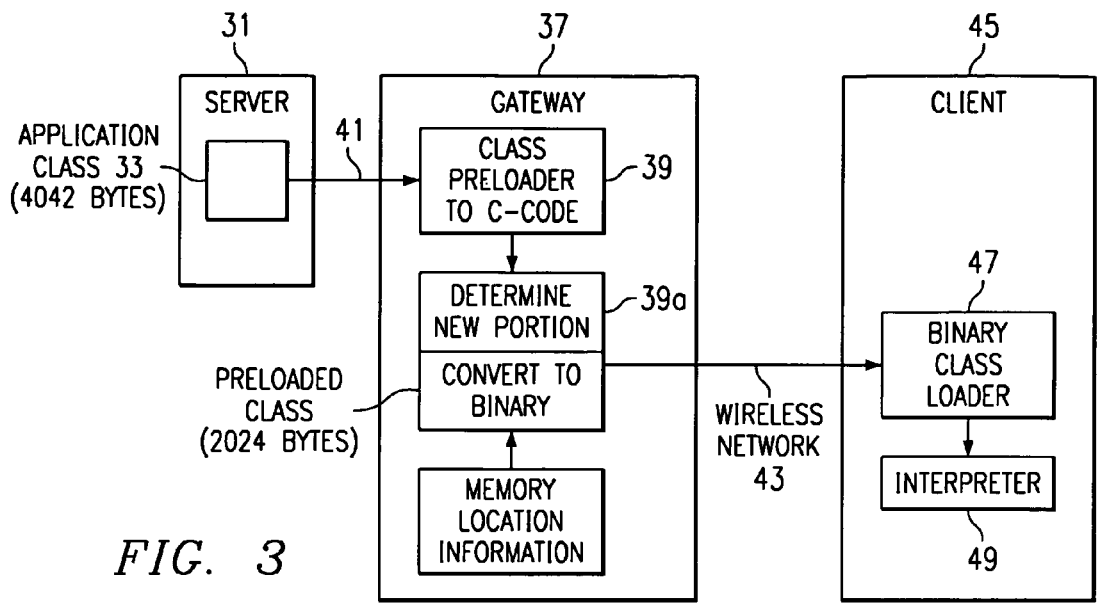
FIG. 3 is a block diagram of one embodiment of the present invention.

Referring to FIG. 3, there is illustrated one embodiment of the present invention. The server 31 contains the application class 33. The application class, for example, is 4042 bytes. The client 35 loads the application through a gateway 37 at or wired to the server at the server location. The gateway 37 at the server includes a Java Code Compact or like device 39 that takes the class as described in connection with FIG. 2 and creates a binary representation of loaded and resolved classes. The Java Code Compact or like device 39 in gateway 37 retrieves the class over the wired network 41, verifies, preloads and preresolves the class to give, for example, a c-code representation of the preloaded and preresolved class. The gateway device 39 in applicant's system further includes element 39a that determines the new portion of the c-code representation. The element 39a at gateway 37 creates a binary representation of only the new portion of the c-code representation of the class. This binary representation of the c-code, along with memory location in the client direction provided at the gateway 37 is sent over, for example, a wireless network 43, for example, to the client 45 having a binary class loader 47 and Interpreter 49. The binary class loader 47 takes and copies into the internal class structure in the Interpreter 49. The result is a full binary image that differs from the original preloaded and preresolved image by the addition of the application class. Since the client 45 already has the original classes that were preloaded and preresolved during the build process, only the new portion of the binary image with the new application class is needed. This portion is transferred from the gateway 37 to the client 45. Once on the client 45, the new preloaded class just needs to be copied into memory and added to the list of binary classes. This reduces the processing requirements on the client 45 from those needed to perform full verify and resolve process to a memory copy. The preloaded class can also be transferred faster since it is smaller than a regular class file. The sample values in FIG. 3 with an application class of 4042 bytes showed a size reduction to 2024 bytes (almost 50%).

The proposed invention allows applications to derive the same benefits of the preloader as the static set of devices classes resolved at build time. Since the classes are resolved and can be verified during this process, this reduces the computing requirements for this phase of interpretation. Less memory is also required since preloaded classes can eliminate redundancies that one found in fully resolved classes.

This lowers the bandwidth and time requirements to transfer application classes over a potentially slow wireless network 43 link between the gateway 37 and the client 45. A further benefit can be obtained by caching these preloaded applications on the server. This would allow multiple clients to take advantage of an application that had recently been preloaded on the server.

Figure 4:
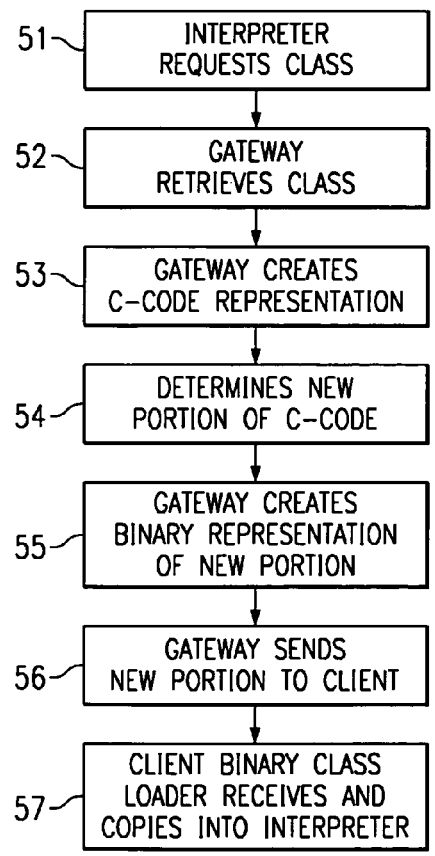
FIG. 4 illustrates the method according to one embodiment of the present invention.

FIG. 4 illustrates the steps of the method, wherein step 51, an Interpreter requests class to be loaded. In step 52, the gateway retrieves class over the network. In Step 53, the gateway creates a c-code representation of all data in the class. In step 54, it is determined where the new portion of c-code representation is. In step 55, gateway creates a binary representation of only the new portion of the binary representation of the c-code representation of the class. Step 56 sends only the new portion of the binary representation to the client via wireless network. In step 57, the binary Class loader in the client takes and copies into the internal class structure in the interpreter.

I claim:

1. A method for loading class files from a server to a client comprising:
   loading an application class onto a gateway that preloads and preresolves said class;
   creating a binary representation of the new portion of the preloaded and preresolved class at said gateway; and
   sending only the new portion to the client.

2. A method for loading Java class files from a server to a client device comprising the steps of:
   a. a gateway retrieving a Java class file;
   b. a gateway preloading and preresolving said Java class file and creating a representation of the Java class file;
   c. determining at the gateway the new portion of said representation of the Java class file not loaded in said client device;
   d. creating at the gateway a binary representation of only the new portion of said representation of the Java class file;
   e. sending said binary representation of said new portion to the client device;
   f. loading said binary representation of said new portion into said client device; and,
   g. copying said binary representation into internal class structure in the interpreter of a Java virtual machine of the client device.

3. The method of claim 2, wherein step b includes creating a c-code representation of the Java class file and step c includes determining the new portion of said c-code representation, and step d creates a binary representation of only the new portion of said c-code representation.

4. The method of claim 2, wherein said sending step e includes sending over a wireless network.

5. A system for loading Java class files from a server to a client device comprising:
   a. a gateway coupled to said server and responsive to receipt of a Java class file for creating a c-code representation of said Java class file;
   b. said gateway creating a binary representation of said c-code representation;
   c. a network coupled between said gateway and said client device for sending the binary representation to said client device;
   d. a loader for loading said binary representation at said client device; and
   e. means for copying said binary representation into the internal class structure in an interpreter of said client device.

6. The system of claim 5, wherein said gateway includes means for determining new portions of the said c-code representation, and in step b said gateway creates binary representations of only new portions of said c-code representations, and in step c said network sending only said new portions to said client device.

7. A method for loading Java class files to an embedded client device from a server comprising the steps of:
   a. a gateway retrieving a Java class file;
   b. a gateway preloading and preresolving the Java class file to produce a representation of the Java class file;
   c. determining at the gateway a new portion of the representation;
   d. creating at the gateway a binary representation of only said new portion of the preloaded and preresolved representation of the Java class file;
   e. sending said binary representation to the embedded client device;
   f. loading said binary representation into said embedded client device; and
   g. copying said binary representation into the internal class structure in the interpreter of a Java virtual machine of the embedded client device.

8. A system for loading Java class files from a server to an embedded client device comprising:
   a. a preloader and preresolver in a gateway coupled to said server and responsive to receipt of a Java class file for preloading and preresolving a representation of said class file;
   b. said gateway creating a binary representation of said preloaded and preresolved representation of said class file;
   c. a wireless network coupled between said gateway and said embedded client device for sending the binary representation to said embedded device;
   d. a loader for loading said binary representation at said embedded client device; and,
   e. means for copying said binary representation into the internal class structure in an interpreter of said embedded client device.

9. The system of claim 8, wherein said gateway includes means for determining new portions of said preloaded and preresolved representations of the class and sending only said new portions to said embedded client device.

* * * * *